Figure 1:
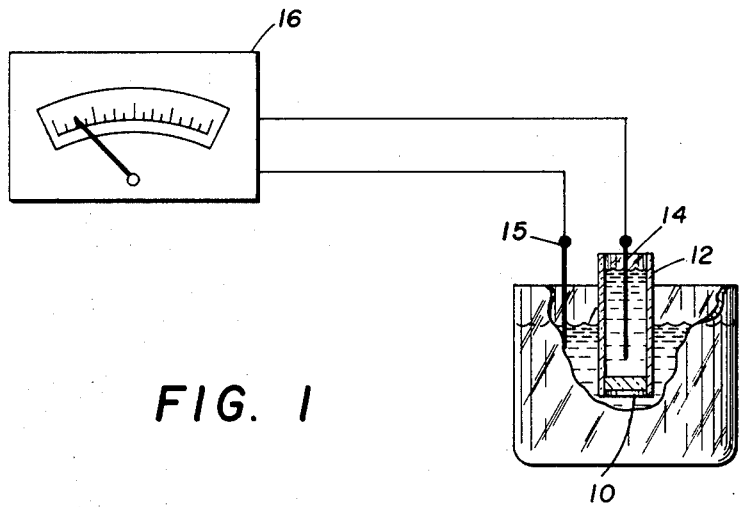

United States Patent [19]

Johnson et al.

[11] 3,709,813
[45] Jan. 9, 1973

[54] ION-SELECTIVE ELECTROCHEMICAL SENSOR
[75] Inventors: Rowland Edward Johnson, Isaac Trachtenberg, both of Dallas, Tex.
[73] Assignee: Texas Instruments Incorporated, Dallas, Tex.
[22] Filed: April 30, 1971
[21] Appl. No.: 139,193

Related U.S. Application Data
[63] Continuation of Ser. No. 768,705, Oct. 18, 1968, abandoned.

[52] U.S. Cl..............204/195 G, 106/47 R, 204/1 T
[51] Int. Cl............................................G01n 27/36
[58] Field of Search.....................106/47 R, 47 Q; 204/1 T, 195 R, 195 G

[56] References Cited

UNITED STATES PATENTS

| | | | |
|---|---|---|---|
| 2,829,321 | 4/1958 | Kopelman | 106/47 |
| 3,177,082 | 4/1965 | MacAvoy | 106/47 |
| 3,312,922 | 4/1967 | Eubank et al. | 106/47 |
| 3,371,211 | 2/1968 | Brau | 106/47 |
| 3,451,794 | 6/1969 | Patterson | 106/47 |
| 3,451,830 | 6/1969 | Nishimoto et al. | 204/195 G |

OTHER PUBLICATIONS

Hilton et al., "Physics and Chemistry of Glassics", Vol. 7, No. 4, Aug. 1966, pp. 105–112

Savage et al., "Physics and Chemistry of Glasses", Vol. 5, No. 3, June 1964, pp. 82–86

Primary Examiner—T. Tung
Attorney—Samuel M. Mims, Jr., James O. Dixon, Andrew M. Hassell, Harold Levine, Melvin Sharp and Richards, Harris & Hubbard

[57] ABSTRACT

The ion concentration of a specific element in a solution may be determined by an ion-selective electrochemical sensor. Ion-selective electrochemical sensors are produced from a non-oxide glass containing a doping element either having a reaction with, or of the same material as the ion concentration to be measured. The action of the ion concentration in the solution with the doping element in the non-oxide glass produces a potential which is a measure of ion concentration. Two techniques are employed to produce the non-oxide glass containing selected ions. One technique produces the composition by combining in one operation the high purity elements required for making a specific glass with the selected elemental material, and the second technique adds a dopant to a pre-treated glass speciman. With both techniques, a quartz ampule containing the glass and dopant is evacuated, sealed and heated. The heated glass and dopant form a molten mass which is agitated to insure complete mixing and then cooled to slightly above the softening point. Solidification of the finished material is accomplished by a quenching step to produce the desired characteristics.

4 Claims, 4 Drawing Figures

PATENTED JAN 9 1973 3,709,813

INVENTORS:
**ROWLAND E. JOHNSON
ISAAC TRACHTENBERG**

*Harold C. Meier*

ATTORNEY

ION-SELECTIVE ELECTROCHEMICAL SENSOR

This application is a continuation of copending application Ser. No. 768,705, filed Oct. 18, 1968, now abandoned.

This invention relates to electrochemical sensors, and more particularly, to ion-selective electrochemical sensors for rapidly determining and continuously monitoring the level of electro-active species in a solution.

Glass electrodes are currently used to determine hydrogen ion concentrations in aqueous solutions. These prior art electrodes are fabricated from oxide glasses containing mobile cations in an immobile ionic lattice, or network, and are thus useful only for measuring hydrogen ion concentrations. Glass electrodes of this type produce an electrical potential by the action of the hydrogen ion concentration in the aqueous solution in contact with a glass membrane separating a solution of known composition from the unknown solution. Although the subject of some controversy, it is believed the electric current in such glasses is carried by the mechanism of ionic migration. Even though the current carrying mechanism has not been definitely defined, the oxide glass electrode does provide a means for accurately determining the hydrogen ion concentration in an aqueous solution.

Heretofore, to measure the ion concentration of other elements in a solution required the use of electrodes using dispersion of precipitates in inert matrices, or solid pellets of an insoluble compound as the membrane material. These are difficult to prepare and use, and have limited utility. One example of this type of sensor is a membrane of rubber containing globules of a material which produces an electrical potential by the action of ions in a solution.

An object of the present invention is to provide an electrochemical sensor sensitive to a particular ion concentration in a solution. Another object of this invention is to provide an electrochemical sensor which will give rapid and specific response to a selected ion concentration. A further object of this invention is to provide an electrochemical sensor of a non-oxide chalcogenide glass. Still another object of this invention is to provide a process for producing an ion-selective electrochemical sensor.

In accordance with this invention, an ion-selective electrochemical sensor for measuring the ion concentration of a selected material in a solution may be fabricated from a non-oxide chalcogenide glass containing a specified concentration of the selected doping material, or a specified concentration of a doping material having a reaction with the selected ions. A typical glass is composed of germanium, antimony and selenium, having largely a covalent bonding between atoms. The chalcogenide glass containing a specified concentration of the appropriate impurity material has a resistivity less than $10^{12}$ ohm-cm, preferably less than about $10^{10}$ ohm-cm.

To fabricate a sensor in accordance with the present invention, a standard compounding procedure may be used or a prereacted chalcogenide glass may be doped by addition of appropriate amounts of the selected material with a subsequent reaction to take them into solution. With either technique, a quartz ampule containing the glass and dopant is evacuated, sealed and placed in a rocking furnace and heated slowly to a temperature required to insure all the elements are in a liquid state. After agitating for a period sufficient to insure mixing of all the elements, the molten mass is slowly cooled to slightly above the softening point; it is then rapidly quenched to a solidification state.

A more complete understanding of the invention and its advantages will be apparent from the specification and claims and from the accompanying drawings illustrative of the invention.

Figure 2:
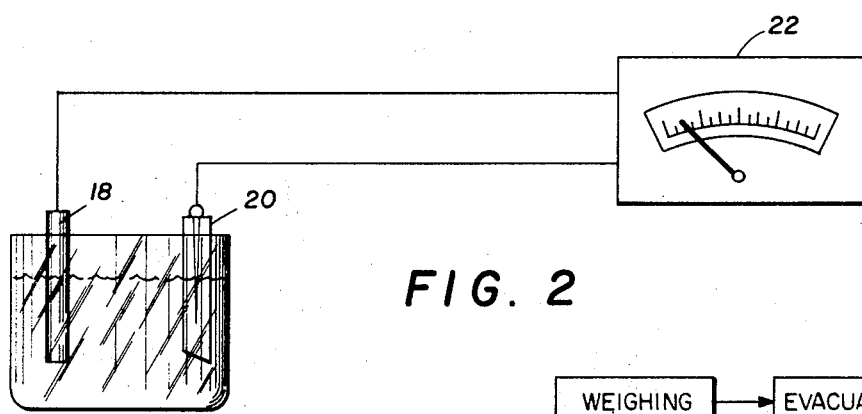
Figure 3:
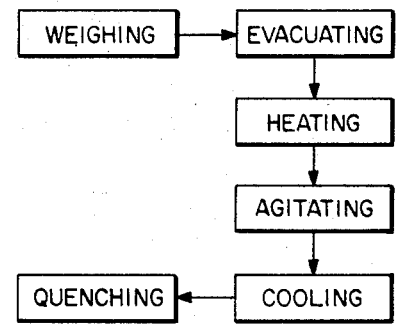
Figure 4:
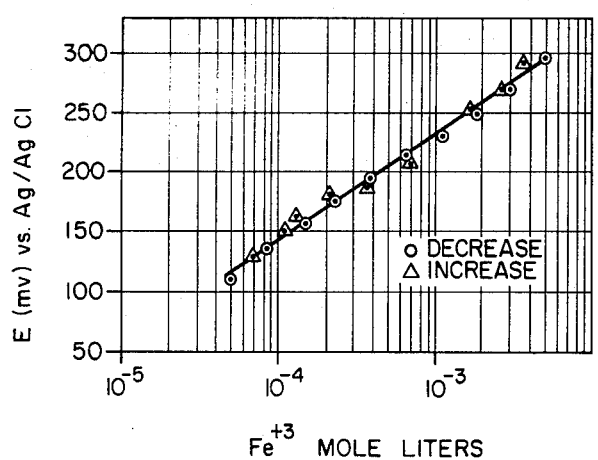

Referring to the Drawings:

FIG. 1 schematically illustrates a membrane sensor of the present invention;

FIG. 2 schematically illustrates an electrode configuration of an ion-selective sensor;

FIG. 3 is a flow diagram of the processing steps for fabricating an ion-selective electrochemical sensor; and FIG. 4 is a plot of electric potential versus ferric ion concentration in a solution for an electrode of a chalcogenide glass and elemental iron.

Although the invention will be described with particular emphasis on non-oxide chalcogenide glasses, it should be understood that various other non-oxide semiconductor glasses may be used. Possibly because of the bond structure, the chalcogenide glasses are relatively soft and not very strong; they can, however, be easily cast which is a definite advantage when attempting to form a glass electrode. As mentioned previously, chalcogenide glasses are also inert to many solutions and are therefore preferred.

A typical chalcogenide glass which was used extensively in experimental work in the development of the present invention has an approximate composition of 60 mole percent selenium, 28 mole percent germanium and 12 mole percent antimony. Other preferred non-oxide chalcogenide glasses and their chemical composition are listed in the table below:

$Si_{25}As_{25}Te_{50}$
$Ge_{10}As_{20}Te_{70}$
$Si_{15}Ge_{10}As_{25}Te_{50}$
$Ge_{30}P_{10}S_{60}$
$Ge_{40}S_{60}$
$Ge_{28}Sb_{12}Se_{60}$
$As_{50}S_{20}Se_{30}$
$As_{50}S_{20}Se_{20}Te_{10}$
$As_{35}S_{10}Se_{35}Te_{20}$
$As_{38.7}Se_{61.3}$
$As_{38}Se_{62}$
$As_{40}S_{60} (As_2S_3)$

The preferred non-oxide glass, however, is the $Ge_{28}Sb_{12}Se_{60}$ composition because of its chemical inertness, mechanical durability, and ease in preparation. The properties of this glass include:

| | |
|---|---|
| Strain Point (viscosity=$10^{14.6}$poise) | 240°C |
| Anneal Point (viscosity=$10^{13.4}$poise) | 259°C |
| Softening Point (viscosity=$10^{7.6}$poise) | 370°C |
| Thermal Expansion Coefficient | $15.0 \times 10^{-6}$/°C |
| Knoop Hardness (50 g load) | 150 |
| Density | 4.67 g/cc |

In accordance with the present invention, a non-oxide chalcogenide glass is doped with a selected material. An electrode fabricated from this doped glass develops an electric potential similar to that observed with the hydrogen ion responsive glass electrode. The particular dopant to be included in the glass depends on the ion selectivity desired. For example, an ionic salt such as sodium fluoride (NaF) enters the glass as (Na+) and (F−) ions separated by the glass lattice and shows a response to the (F−) ion concentration in an aqueous solution.

Generally, any material which will be accepted by the non-oxide glass and develops an electric potential may be used as the dopant to produce an electrode responsive to a particular ion concentration in a solution. There are two basic classes of materials which are used; elements of the same type as the selected ion concentration to be measured are grouped as one class; and elements which react with selected ions are a second class. The mole percent of the impurity to be included in the non-oxide glass depends upon the particular dopant. Basically, doping should be as heavy as possible to obtain optimum response to a particular ion concentration at a desired resistivity. An excess impurity level, however, will adversely affect the response. The following is a list of some of the impurities that may be combined in a glass having the composition $Ge_{28}Sb_{12}Se_{60}$:

| | |
|---|---|
| $BaCl_2$ | $MnCl_2$ |
| CdSe | MnSe |
| $CaCl_2$ | Mn |
| KI | $Fe_2Se_3$ |
| KCl | FeSe |
| AgCl | Fe |

An important property of the doped glass is the resistivity. To be compatible with present day measuring equipment, the doped glass resistivity should be less than $10^{12}$ ohm-cm, preferably less than about $10^{10}$ ohm-cm.

Depending on the type of conductivity (ionic or electronic), the doped glass is used either as a membrane, which requires two reference electrodes and one reference solution, or as an electrode requiring only one reference electrode to complete the electrochemical cell. Referring to FIG. 1, there is shown schematically a doped glass membrane 10 attached in a sealing relationship at the bottom of a tube 12. The membrane 10 is immersed in a solution containing a particular ion concentration to which the membrane will respond. One reference electrode (illustrated as a single rod 14) is mounted within the tube 12 which has been filled with a reference solution of known ion concentration. A second reference electrode 15 is required; this second reference electrode is placed in the solution outside the tube 12. Connected to the reference electrodes is a voltmeter 16. This meter may be a Keithley Model 610B Electrometer having an input impedance in excess of $10^{14}$ ohms.

Referring to FIG. 2, there is illustrated an electrode 18 of a doped non-oxide glass and a reference electrode 20 to complete an electrochemical cell in a solution containing ions of a selected element, the concentration of which is to be measured. The potential developed by action of the ion concentration on the electrodes 18 and 20 may be measured by a voltmeter 22, preferably having a high input impedance. For an electrode configuration, the conductivity is believed to be of an electronic nature, whereas, with the membrane configuration ionic conductivity produces the potential measured by the meter 16.

The glassy materials for the sensors of the present invention may be prepared by either compounding the glass from selected elements, with direct addition of the desired impurity material, and reacting all the constituents at one time, or doping preacted chalcogenide glass by addition of appropriate amounts of dopant and a subsequent reaction to take them into solution. In the compounding procedure, high purity elements making up the composition of the glass and a desired doping element are weighed and sealed in an evacuated quartz ampule. The evacuated ampule is placed in a furnace and heated to a temperature at which all the components are melted. For a selenium, germanium, antimony glass, the furnace is heated to between 900 and 1,000° C. A gentle rocking motion is imparted to the furnace to mix and/or react the constituents for an extended period of time from 2 to 24 hours. After the mixing and/or reaction has been taken to completion, the ampule is cooled to above the softening point of the melt. The melt is then air-quenched to solidification and annealed for 2 to 3 hours to remove any strains which may have developed during the cooling cycle.

Since there appears to be no observable difference in the properties of doped glasses prepared from prereacted non-oxide glass and those prepared from the elements, the preferred technique is to dope prereacted glasses. This eliminates some variability in the compounding, since the base glass can be prepared in a large batch (1500 grams) and then used in the small amounts required for a sensor. This also assures conformity of composition and a very high, constant purity level. Because of the advanced technology in preparing the non-oxide chalcogenide glasses, prereacted glass has been made to be virtually free from cationic impurities (approximately 10 ppm total) and has a low oxygen content (less than 20 ppm).

Referring to FIG. 3, there is shown a flow diagram of a process for producing glass for ion-selective electrochemical sensors using prereacted non-oxide chalcogenide glass as a host material. A weighed sample of the chalcogenide glass is placed in a quartz ampule along with a desired amount of an impurity material. The amount of impurity material is selected to provide a desired mole % of the dopant in the finished glass. The quartz ampule is then evacuated and sealed (under a vacuum) to provide a contamination-free atmosphere within the ampule. Next, the ampule is placed in a furnace and heated to a temperature above the melting point of the glass sample. The molten mass is then agitated by rocking the furnace for an extended period of time. After a thorough mixture of the dopant with the sample has taken place, the molten mass is allowed to cool to slightly above the softening point temperature of the glass. The final step is to cool the sample under controlled conditions to provide a glass having the desired characteristics.

For a membrane, a doped glass made by the above process is simply shaped to a desired configuration and sealed in the end of a tube, as illustrated in FIG. 1. An electrode, such as electrode 18, made from the doped glass, must have an ohmic contact applied thereto. This ohmic contact may be formed by evaporating a thin film of gold on the hot glass before quenching.

The primary objective in doping semiconductor glasses is to fabricate homogeneous (on a macro-scale), mechanically sound material doped as heavily as possible with some form of the desired element. The dopants used are principally metals, salts, or other compounds containing the elements for which electrochemical response is desired. The crystalline phase formed by the techniques described above vary in size, shape and chemical composition depending on the various dopants used. The dopant may crystallize out in exactly the same elemental or compound form in which it was added; it may combine with one of the elements which make up the glass and crystallize out in the form of some different compound; or it may not crystallize out at all. The crystallites have been found to be of various shapes and sizes. In some cases they are roughly spherical, enbical, or star-shaped; but more often they are dendritic or interlocking needle-type crystals. The size of these dispersed crystals varies from a few hundred Angstroms (KI-doped glass) to nearly a millimeter (AgCl-doped glass).

As mentioned previously, the preferred non-oxide chalcogenide glass has a chemical composition of 60 mole percent selenium, 28 mole percent germanium, and 12 mole percent antimony. Membranes and electrodes made from this glass are inert to solutions of $K^+$, $Na^+$, $B^-$, $Cl^-$, $CO_3^-$, $Cd^{+2}$, $Ca^{+2}$, $Mn^{+2}$, and $Ag^+$, among others. This glass has been found to be insensitive to pH changes up to a pH of 10 or 11. Because of its inert properties, $Ge_{28}Sb_{12}Se_{60}$ glass is an ideal host material. The following are examples of a non-oxide $Ge_{28}Sb_{12}Se_{60}$ glass doped with various impurities.

Example 1

A sample of pretreated non-oxide chalcogenide glass having a composition of 60 percent selenium, 28 percent germanium, and 12 percent antimony was heated in an evacuated quartz ampule with AgCl to a temperature between 900 to 1000° C. After air cooling and quenching, the finished glass contained 2 mole percent of AgCl. The resistivity of the finished glass was calculated from current-voltage data, and at room temperature was approximately $3.8 \times 10^{10}$ ohm-cm. The potential response of an electrode made from this glass to $Ag^+$ concentration was quite good over the concentration range from $10^{-6}M$ through $10^{-2}M$ $Ag^+$. The differential change in the potential per a differential change in the $Ag^+$ concentration varied from 50mV to 80mV/decade over the concentration range.

Example 2

A non-oxide chalcogenide glass of the same composition as in Example 1 was heated in an evacuated quartz ampule with metallic iron. After a thorough mixing which may take up to 24 hours, the finished sample contained 2.39 mole percent of $Fe°$. Specific resistivity of the doped glass sample was again calculated from current-voltage data, and at room temperature was about 200 ohm-cm. Before showing a response to ferric ions in an aqueous solution, the electrode of this example was conditioned by etching the solution side of the electrode with a 10 wt. % KOH-10 wt. % $NaH_2PO_2$ solution for about 15 seconds at room temperature, and then soaking in $0.1M Fe^{+3}$ solution for about 15 minutes. The potential response of such a preconditioned electrode to $Fe^{+3}$ is quite good.

FIG. to FIGURE 4, there is shown a plot of response in millivolts versus $Fe^{+3}$ concentration in a solution of 0.1M in $KNO_3$ for the electrode of Example 2. The millivolt response is given with Ag/AgCl as the reference electrode. Actual readings taken when the concentration was being increased are identified by the Δ symbol, and readings taken when the concentration was being decreased are identified by the O symbol. This curve clearly illustrates how an electrode of the present invention may be used to quickly and accurately measure the ion concentration of a solution.

While several embodiments of the invention, together with modifications thereof, have been described in detail herein and shown in the accompanying drawings, it will be evident that various further modifications are possible without departing from the scope of the invention.

What is claimed is:

1. An electrochemical sensor for measuring the concentration of selected ions within a material, comprising in combination:
   a. first and second reference electrodes, said first reference electrode electrically contacting said material in which the ion concentration is to be measured and said second electrode electrically contacting a reference material having a known ion concentration;
   b. a doped chalcogenide glass membrane having a first surface contacting said material in which the ion concentration is to be measured and a second surface contacting said reference material; and
   c. means for measuring the electrical potential between said first and second electrodes, said potential having a known relationship to the ion concentration of said selected ion within said material.

2. An electrochemical sensor in accordance with claim 1 wherein said chalcogenide glass membrane is doped with an impurity selected from a group consisting of $BaCl_2$, CdSe, KI, $CaCl_2$, KCl, AgCl, $MnCl_2$, MnSe, Mn, $Fe_2Se_3$, FeSe and Fe.

3. An electrochemical sensor for measuring ion concentration, comprising in combination:
   a. a reference electrode and a doped chalcogenide glass measuring electrode electrically insulated from each other, each of said electrodes electrically contacting a material in which the ion concentration is to be measured; and
   b. means for measuring the electrical potential between said electrodes, said potential having a known relationship to the ion concentration in said material.

4. An electrochemical sensor in accordance with Claim 3 wherein said chalcogenide glass membrane is doped with an impurity selected from a group consisting of $BaCl_2$, CdSe, KI, $CaCl_2$, KCl, AgCl, $MnCl_2$, MnSe, Mn, $Fe_2Se_3$, FeSe, and Fe.

* * * * *